July 10, 1934.  A. PREISMAN  1,966,185
APPARATUS FOR MEASURING ELECTRICAL CONDUCTIVITY
Filed April 17, 1928  3 Sheets-Sheet 2
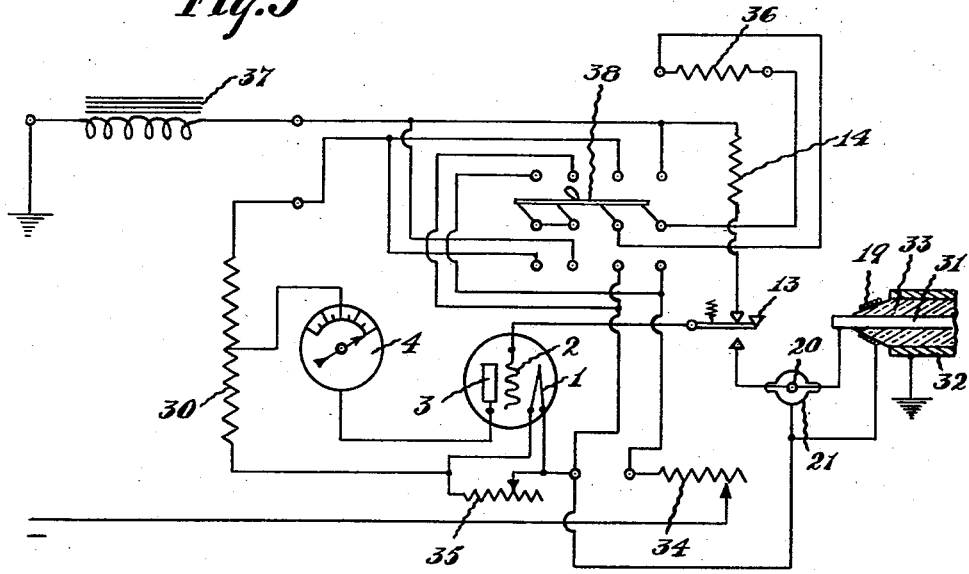
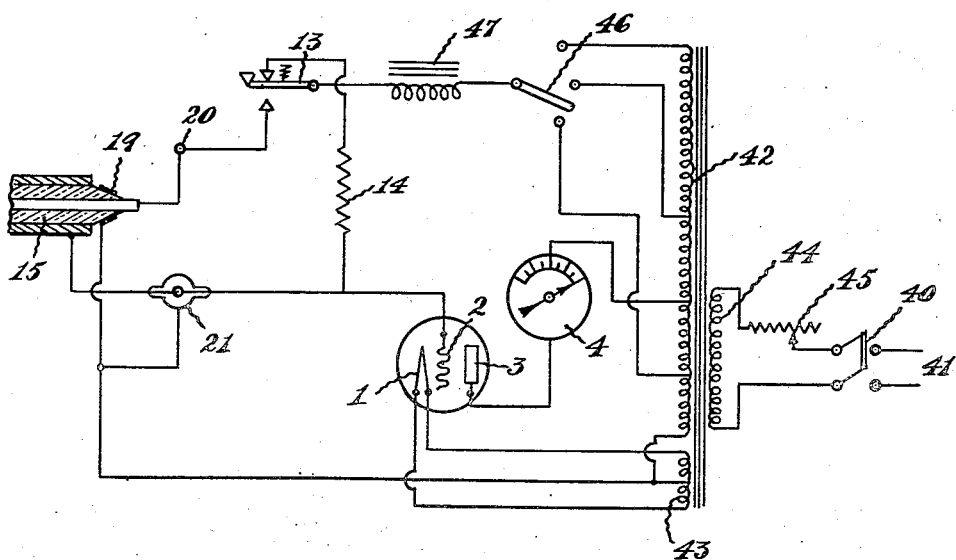
INVENTOR
Albert Preisman,
BY
Harold S. Penney ATTORNEY July 10, 1934.　　　　A. PREISMAN　　　　1,966,185
APPARATUS FOR MEASURING ELECTRICAL CONDUCTIVITY
Filed April 17, 1928　　　3 Sheets-Sheet 3

INVENTOR
Albert Preisman,
BY
Harold D. Penney　ATTORNEY

Patented July 10, 1934

1,966,185

UNITED STATES PATENT OFFICE 1,966,185

APPARATUS FOR MEASURING ELECTRICAL CONDUCTIVITY

Albert Preisman, Bronx, N. Y.

Application April 17, 1928, Serial No. 270,741

22 Claims. (Cl. 175—183)

My present invention relates to methods of, and apparatus for electrical measurements, and has particular reference to a method of, and apparatus for ascertaining the electrical conductivity of materials, especially those of resistances varying from one to one thousand megohms or more.

Practical experience has revealed various defects in ohmmeters in present usage. For example if resistances are measured which are indicated near the infinity end of the scale of present day ohmmeters, wholly unreliable readings are obtained.

Again ohmmeters now in use that are adapted to measure high resistances are expensive and built of dynamic parts that are delicate. Moreover, they cannot utilize alternating current, as a source of potential. All these limitations handicap their every day use.

Now, I have discovered certain principles involved in the performance of the well known audion or electronic discharge tube, and applied them in an effort to produce an instrument which will not only be an ohmmeter capable of accurately measuring resistances, but one that is capable of many independent uses, and yet be comparatively inexpensive, rugged in construction, and capable of use with alternating current, as well as direct current.

Heretofore, it has been considered; that if the grid element of an electronic discharge tube, hereinafter referred to as an audion for brevity, be insulated from the filament element by a resistance of forty megohms or more, then it will be "free". That is to say, it will assume a potential in most cases which is negative with respect to the cold negative end of the filament.

Again, prior to my discovery, it has been thought that the "free" grid potential is not a reproducible value but that it depends upon the values of the filament and plate voltage, and also upon which of the two circuits, the plate or filament, are closed first.

But, using standard UX201 A, UX240 and UX210 tubes, I have found the "free" grid to be always negative relative to the filament. Again, I have discovered that contrary to the aforementioned teachings of the prior art, the potential of a "free" grid, as measured by the plate current, is always the same for the same filament and plate potentials, or if both of these be increased or decreased by a reasonably small amount, the plate current due to the "free" grid is practically unchanged.

The following analysis of my discovery is to be considered only as a theoretical explanation, since I have applied this discovery in practical embodiments to be hereinafter described. Assume, then, a circuit including a tube having a "free" grid as defined above. The negatively charged "free" grid tries to discharge its electrons onto the cold filament end 5, through any leakage resistance $r_t$ which may present itself, whether over the glass of the tube or in the socket. Since electrical potential is a form of energy, we may say that the heat energy of the filament is transformed into electromotive force $e_g$ at its heated surface, which force propels the electrons onto the grid until the latter charges up to a potential equal and opposite to $e_g$.

Thereafter, the only current that flows from the filament to the grid is that required to replenish the charge of electrons that has leaked off through $r_t$, and this current is exceedingly small. This minute discharge current $i_g$ flows through the internal resistance $R_{gf}$ between the grid and filament. This is not a true resistance, but for the present may be regarded as such. The relation between these various factors may be expressed as follows:

$$e_g = i_g(r_t + R_{gf})$$

Normally $R_{gf}$ is very small compared to $r_t$, so that we may write $e_g = i_g r_t$. If we take a resistance to be measured, $R_x$, and connect it across the grid and filament (let us say the cold negative end), $i_g$ is increased to $i'_g$ since $R_x$ shunts $r_t$, and the new value of the discharge resistance may be expressed as follows:

$$R_d = \frac{1}{\frac{1}{R_x} + \frac{1}{r_t}}.$$

I now have $$e_g = i'_g(R_d + R_{gf})$$

where $$i'_g > i_g.$$

This means $i'_g R_{gf}$ (assuming $R_{gf}$ constant) is greater, and therefore $i'_g R_d$, the potential to the cold end of the filament, less. This allows $I_p$, the plate current, to be greater by an amount $\Delta I_p$, and if $\mu$ equals the amplification factor of the tube, and $R_p$ the internal plate impedance, $$\Delta I_p = \frac{\mu}{R_p}(i_g r_t - i'_g R_d)$$

Thus $\Delta I_p$ is a measure of $R_x$, assuming that everything, even $\mu$ and $r_t$, remain constant for the tube. Now the leakage in the tube, $r_t$, may be expected to vary, and moreover, since $R_x$ shunts it, a great variation in $R_x$ will not produce as great a variation in $I_p$ as it would if $R_x$ were the only path over which the grid could discharge.

To make $R_x$ thus relatively independent of $r_t$, and accomplish many other things, a grid battery is employed. Reference to the drawings, especially Fig. 1, shows that $R_x$ is now in series with the grid, i. e., in series with both $R_{gf}$ and $r_t$, and the latter two are in parallel. Since $r_t$ is very large compared to $R_{gf}$, it may vary through a great range without becoming comparable to $R_{gf}$, and since it is now in series with $R_x$, the latter may be as large as desired without $r_t$ affecting it, since the latter is shunted by the far lower resistance $R_{gf}$.

Let the voltage of the grid battery be $E_g$. The total voltage $E_t$ in the grid circuit is $$e = E_g - e_g$$

(since $e_g$ is inherently negative when viewed from the cold end of the filament). The resistance in the grid circuit, neglecting $r_t$ as being negligible in effect when shunting $R_{gf}$, is equal to $R_x + R_{gf}$. The grid current $i_g$ is much larger, and is equal to $$\frac{E_t}{R_x + R_{gf}}.$$

The voltage between the grid and filament is now $$E_t\left(\frac{R_{gf}}{R_x + R_{gf}}\right) + e_g$$

where $e_g$ is practically the "free" potential of the grid—with respect to the filament, and negative. As $R_x$ decreases, the first part of the last mentioned expression increases until equal to $e_g$, and then exceeds it, so that the grid finally becomes positive with respect to the filament.

The total plate current is now $$I_p = \frac{E_p}{R_p} + \frac{\mu}{R_p}\left(\frac{E_t R_{gf}}{R_x R_{gf}} + e_g\right),$$

where $R_p$ is the plate voltage.

Since $E_p$, $E_t$, and $E_f$ (filament voltage) are constant, I may write, (1) $\quad I'_p = \frac{\mu E_t}{R_p}\left(\frac{R_{gf}}{R_x + R_{gf}}\right),$ where $I'_p$ corresponds to $\Delta I_p$ mentioned before, and represents that part of $I_p$ which varies with $R_x$.

Taking the partial derivative of (1) with respect to $R_x$, we have (2) $\quad \frac{\delta I'_p}{\delta R_x} = -\frac{\mu E_t R_{gf}}{R_p}\left(\frac{1}{(R_x + R_{gf})^2}\right)$ This shows that the greater $E_t$, $\mu$, or $R_{gf}$ are, or the smaller $R_p$, the greater the slope of (1) is, or the more "open" the scale on the plate meter will be, and the more sensitive the device will be.

Equation 1 shows that if $I'_p$ and $R_x$ are the only variables, the curve is a hyperbola. In practice, I have found the curve ($I'_p$ vs $R_x$) to have this general shape, but not exactly so, and this is to be expected, since it is known that $R_{gf}$, $R_p$, and $\mu$ vary with $I'_p$, instead of being constant. Moreover, $R_{gf}$ and $R_p$ are not true resistances.

Referring to Equation 2, we see that for any given value of $R_x$, increasing $E_t$ increases the slope at that point. Since the curve is essentially hyperbolic in nature, the slope is much larger for small values of $R_x$ than for large, so that if we want a great variation in $I'_p$ for changes in $R_x$ when the latter is large, we must use a high grid potential $E_t$. Equations 1 and 2 also show that the higher the $\mu$ of the tube the more sensitive the device is, and the more "open" its scale is. A high $\mu$ tube generally has both a higher $R_{gf}$ and $R_p$, so that these tend to balance, thus resulting in a net gain in amplification.

It will therefore be seen that by measuring the plate current of an audion tube having the material to be measured connected in series between a grid battery and the grid, I can ascertain quantitatively the conductivity of the material even if this be very low and comparable with the leakage in the tube and associated parts. I have, in addition thereto, devised various arrangements which enable this fundamental invention to be readily operated with any type of audion tube, and applied to uses to be hereinafter fully disclosed.

While one of the principal uses of the principles above described is for the measurement of resistance or conductivity, especially if the former be of exceedingly high values, the invention is also applicable to other uses. In fact, conductivity of electrolytes and ground resistance may be measured, using in such cases alternating current to avoid polarization of the electrolyte liquid or earth. As regards the measurements of high resistances, the apparatus and method disclosed herein may be used to measure insulation resistance of cables, motors, generators, transformers and other electrical apparatus.

Again, the resistance, purity, quality and condition of electrical insulating materials such as transformer or other oils, paper, bakelite, rubber may be ascertained through the application of the principles noted above.

Some additional uses to which the herein described apparatus and method can be put are, the detection of smoke or other conducting material in waste industrial gases; the strength of X rays by their ionizing effect upon air between two electrodes; as a ground detector in an ungrounded electrical system, such as a two phase four wire ungrounded system. Many other applications of the principles disclosed herein will readily suggest themselves.

Accordingly one of the main objects of my invention is to provide a method of, and apparatus for indicating quantitatively the conductivity of materials, comprising inserting such materials in series with the grid of an electronic discharge tube, and a source of grid potential, the value of the plate current of said tube at a specific grid potential being a measure of the conductivity of the particular material being measured.

Another object of my invention is to provide a direct reading ohmmeter comprising an electronic discharge tube having a material to be measured and a source of grid potential in series with the grid of the tube, the said grid potential source being adjustable to render the ohmmeter multi-range, and independent of tube or voltage variation.

Another object of my invention is to provide a direct reading multi-range ohmmeter having an electronic discharge tube in the structure thereof which is capable of use with alternating current as well as direct current sources.

Still another object of my invention is to provide a direct reading, multi-range ohmmeter capable of indicating upper scale readings with a great degree of accuracy, and having means associated therewith whereby tube and voltage variations do not affect the accuracy of the instrument.

Other objects of my invention are to improve generally the simplicity and efficiency of such devices and to provide a device or apparatus of this kind which is durable, reliable in operation, and economical to manufacture.

Still other objects of my invention will appear as the description proceeds, and such objects should be considered as included in the herein statement of the objects of invention.

The invention may now be more fully understood from the following description when read in connection with the accompanying drawings in which:

Fig. 3 is a circuit diagram of an apparatus similar to Fig. 1, but utilizing direct current from supply mains.

Fig. 4 is a circuit diagram showing the arrangement of the apparatus in Fig. 1, for connection to an alternating current source.

Figure 1:
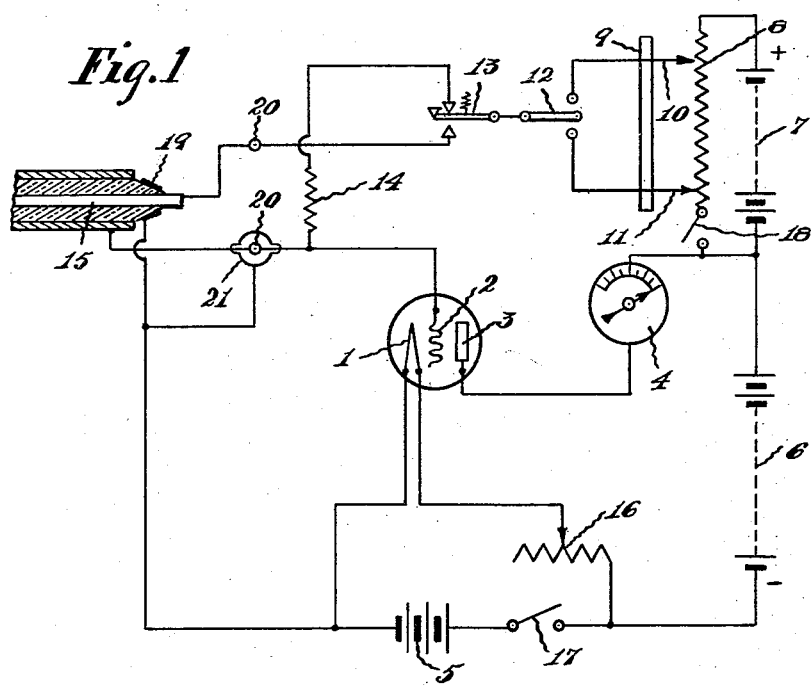
Fig. 1 is a cricuit diagram of an apparatus, operated by direct current batteries, and adjustable for use with any audion tube, by means of which the method is carried out.

Referring to Fig. 1, reference characters 1, 2 and 3 designate the filament (electron emission electrode), grid and plate respectively of a tube of conventional design. The filament 1 is heated by a current source known as the filament or "A" battery and designated as 5. The thermionic current between the filament (hot cathode) and the plate (cold anode), is caused to flow through a plate current meter 4 (milliammeter) by means of a plate or "B" battery 6. Of course any other forms of electronic discharge devices may be employed in carrying my invention into effect.

The grid 2 is connected to a source of adjustable potential or grid battery 7 which is positive relative to the filament. As will be observed from Fig. 1, part of the "B" battery could be used as the grid battery. The material whose electrical characteristic is to be ascertained, is interposed in the circuit between the grid 2 and the battery 7. In Fig. 1 the insulation resistance of a cable 15 is to be measured. It should be noted that the cable possesses capacity as well as resistance.

A potentiometer 8 is placed in the circuit between the unknown cable resistance 15 and the grid battery 7 in order to adjust the positive potential being applied to the grid. This device is used to correct for tube or battery voltage variations. An insulated support 9 for two tap-offs 10, 11 constitutes the adjusting mechanism. The support 9 operates as one unit and thereby, by means of switch 12 which allows either grid potential to be applied to the grid 2, gives the instrument two ranges since either tap 10 or 11 may be connected to the grid. The advantage of such an arrangement will be explained later.

A conventional two-point push button switch 13, or any other type of double-throw switch connects, the potentiometer to the unknown cable resistance 15, or a calibrated high resistance 14. The calibrated resistance is normally connected to the switch 13 and is in circuit between the grid potential source 7 and the grid 2. Its purpose is to enable the plate meter 4 to be referred to a predetermined mark by varying the grid potentiometer 8, thus ensuring a constant reference point regardless of battery or tube variations.

Guard terminals 19 and 21 of conventional design are interposed in the circuit from the insulation of cable 15 and the contacts 20 to the filament battery 5. The purpose of the guard terminals is to prevent false readings due to leakage, whether in the set, or over the surface of the material being tested. These expedients assure accurate determinations when dealing with extremely high resistances.

A pair of battery switches 17 and 18 control the filament battery and grid battery respectively, and in actual construction they may be operated as a unit in the form of a two-pole single, throw switch. To compensate for voltage variations in the battery 5 a filament rheostat 16 is inserted in the filament circuit.

As previously explained, the plate meter 4 measures the resistance $R_x$ of the material between the contacts 20. If the resistance is infinite in value, as where the contacts 20 are not connected to anything, the grid 2 is essentially "free". It assumes a negative charge with respect to filament 1, thus causing the plate current to be very low. As this unknown resistance, $R_x$, decreases through finite values, the grid, with the aid of the grid battery, 7, is able to discharge to the cold end of the filament.

The grid thus becomes less negative, thereby allowing the plate current $I_p$, to increase. This increase is noted on the milliammeter 4 in the plate circuit which may be calibrated to read directly in megohms. As shown in Fig. 1, and it being understood that the switches 12, 17, 18 are closed, the pointer is at the low end of the scale, the scale reading directly in values of resistance R. As the resistance of the material being measured increases, the pointer moves to the left. When resistance of infinite value is measured, as explained before, the pointer is near the extreme left, or infinity position of the scale. This should be obvious from the fact that, as stated in the previous paragraph, when the grid is "free" (that is to say, the resistance between the contacts 20, 20 is infinite), the plate current is very low.

For every value of $R_x$ there will be a corresponding value of $I_p$, provided all voltages are maintained constant at some predetermined values. The adjustable external grid potential 7 insures this in the following manner. I have determined experimentally that in order to adapt different tubes of the same type to the same scale on the meter 4, it is necessary to adjust the zero-error correction thereon, to get the same "free" grid reading. This is done by letting the unknown resistance be infinity, as would be the case with air. Then the smallest $R_x$ value is found that can be read on that scale range. In other words, it is necessary to adjust the instrument to read the same at the two extremes of the scale namely— at $R_x = \infty$, and $R_x =$ lowest value indicated on the scale.

This is accomplished by means of the calibrated resistance 14 and is based on the fact that while different tubes may vary in their actual plate currents for a given value of $R_x$ (unknown resistance), and $E_t$ (total grid voltage), their $R_x$ vs. $I_p$ curves are practically identical. Hence, if these curves for various tubes are matched at their extreme values intermediate values will coincide to about an accuracy as can be detected on the meter 4.

In use, then, assuming that it has been predetermined that when the potentiometer 8 has been tapped as shown in Fig. 1, the switch 12 closed on a desired contact, and the switches 17, 18 closed, the meter 4 reads as shown in Fig. 1, when switch 13 is in normal position. That is to say, the resistance of the calibrated element 14 is being measured. Prior to this, the infinity resistance reading has been taken by leaving the contacts 20 free, and depressing the switch 13.

For different tubes this infinity reading on meter 4 may vary, but by means of the zero-error correction on the meter the pointer may be set to the infinity mark on the scale. Then, if the known resistance is off the calibrated resistance mark on the scale, by shifting 9, and releasing switch 13 so that it is in normal position, the pointer of the meter may be set over the calibrated value on the scale. Obviously, adjusting the grid voltage would have no effect on the other end of the scale where the resistance is infinity.

Thus, when the cable 13 is now connected to the contacts 20, regardless of the fact that tubes have been changed or that a particular tube has been used for a long time, the switches 17, 18 are closed and the pointer observed on the meter 4. If the pointer is not over the calibrated value of the scale, the potentiometer 8 is adjusted until the pointer is over the value. Of course, the switch 12 is closed on either tap, depending on whether the higher potential represented by tap 10 is to be used, or whether the lower potential represented by tap 11 is to be used.

Then the key 13 is depressed and the pointer reading on the meter observed. Should other readings be taken, the key 13 constantly indicates due to its normal position that the instrument is reading true. If the battery strengths change, or any other variation occurs, the instrument can be made to read the same for all values of $R_x$ between infinity and the lowest value that can be read on the meter, by the means described above.

The advantages of using an adjustable external grid potential source may be summarized as follows:

1. It makes the instrument more sensitive to large values of $R_x$.
2. At the larger values of $R_x$, the scale is more open.
3. In conjunction with the zero-error adjustment of the meter, it enables different tubes to be adapted to the same scale on the plate meter, thus making the instrument a measuring device rather than a mere translating or indicating device.
4. It places $R_x$ in series with the tube and socket leakage, instead of in parallel to it, so that $R_x$ can be read more accurately at high values, and also renders the instrument independent of relatively large variations in leakage.

Figure 2:
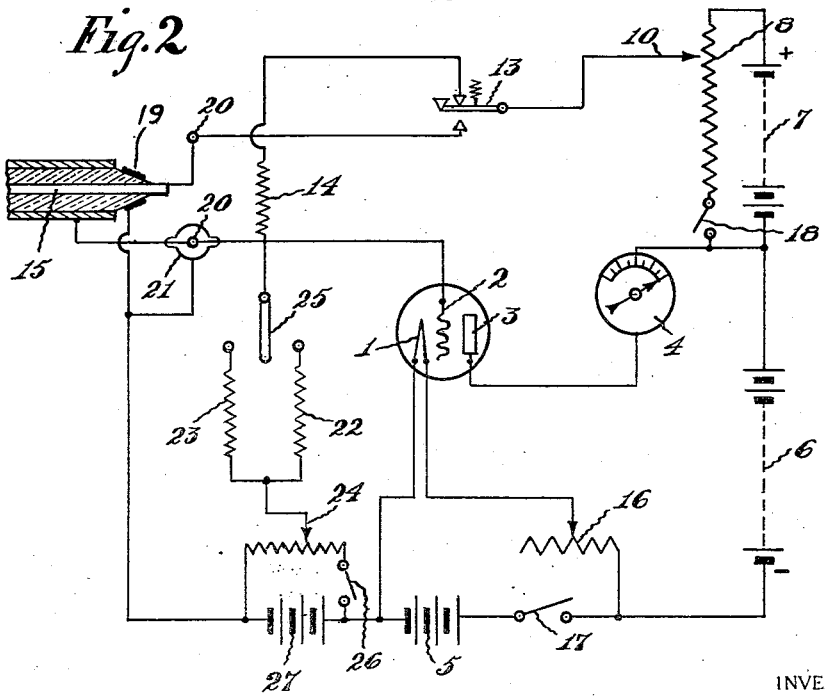
Fig. 2 shows a modified form of construction which may be utilized as an alternative to the arrangement shown in Fig. 1.

In Fig. 2, there is shown an alternative method of making the instrument multi-range. That is to say, this modification substitutes certain elements for the assembly 9 in Fig. 1. The same numerals will be used in Fig. 2 for the same parts as appear in Fig. 1. In this form, a double-throw switch 25 is used to connect either one of two grid-shunting resistances 23, 22 to the grid 2; or, to disconnect either, and allow the grid to be "free". In the latter case the instrument is most sensitive. In the former case, the lower 23 or 22 is, the less sensitive the instrument is. That is to say, full scale reading requires a lower value of $R_x$. Any capacity effect in the material being measured, in this form or as in Fig. 1 or Fig. 3, should not affect the reading once it is charged up, since practically constant direct current is applied.

An adjustable potentiometer 24 used in conjunction with a "C" battery 27, gives an adjustable bias to 23 or 22 equal to the "free" grid potential. This is done to prevent alteration of the grid potential when either 23 or 22 is connected to it, and thus assure a constant infinity reading on the meter 4. A battery switch 26 is provided, and may, with switches 17 and 18 be assembled as a three-pole single throw switch.

Thus it will be seen that by this arrangement only one value, tap 10, or grid voltage from battery 7 is required. Different tubes, or variations in battery strength are compensated by means of the zero-error correction, and by movement of tap 10.

Another application of the principles discussed herein is shown in Fig. 3. In this use of the fundamental circuit shown in Fig. 1, instead of using dry batteries, potential for the circuit can be derived from a grounded or ungrounded direct current, system such as a lighting source. Elements common to Figs. 1 and 2 will be designated by the same numerals as shown therein.

Fig. 3 shows the device being used for testing cables whose copper conductor 31 is connected to the contact 20 of the instrument, while, the lead sheath 32 is grounded. The insulation 33, having both $R_x$ and $C_x$ (that is, unknown resistance and capacity) is to be measured. It should be noticed that the lead sheath is positive to the conductor 31 and the grid 2 which is connected thereto. In this case, if the lead sheaths of the cables to be tested are grounded (as is usually the case), the negative and neutral (ground) mains must be used as shown. It cannot be used with the positive and neutral mains for the above conditions of test, since the neutral is almost invariably grounded.

In order to reduce the voltage applied to filament 1, a resistance 30 is introduced into the circuit and tapped by the meter 4. The effect of 30 renders the filament negative to the ground, and in an ungrounded direct current system, negative to the positive main. An adjustable resistance 35 is connected to the circuit to vary the amount by which the filament is negative to the positive main, and thus vary both the plate and grid voltages. It will be observed that the grid when "free" is negative with respect to the filament, and so also negative with respect to the positive main to an amount depending upon $R_x$.

In this application, as in Fig. 1, the push button switch 13 is normally in contact with the line leading through the calibrated resistance 14. Here, the resistance 34 is varied instead of the taps 10 and 11, as in Fig. 1. An adjustable resistance 35 is shunted across the filament 2, to by-pass excess current when a tube is first calibrated. It need not be adjusted thereafter until the tube characteristic changes considerably.

A fixed resistance 36, which can be placed on either side of the filament and plate so as to make both more or less negative to the positive main, is connected to the circuit by a switch 38. The fixed resistance 36 provides two values of grid voltages for two ranges.

An inductance or choke coil 37 is interposed in the circuit to take care of momentary voltage fluctuations. Here, as in all other cases, guard rings 19 are wrapped around the surface of the insulation of the cable and around the grid terminal 20 to collect any surface leakage current over the insulation and the device itself. This brings the leakage current directly back to the filament, instead of the grid where it would indicate on the plate meter 4 as a lower value of $R_x$.

As in Figs. 1 and 2, the device is checked before use by the calibrated resistance 14 and then used as heretofore described. As an alternative, shunting resistors, similar to 23 and 22 Fig. 2, can be used to provide multi-range. Negative bias can be obtained by inserting a resistor between the negative side of the filament and resistance 34, and then connecting the shunting resistors to that side of the bias resistances connected to 34. The proper value of the negative bias is such that whether the grid is "free" or the shunting resistors connected, the plate current is the same. Obviously in the direct current, type, an independent generator, such as a magneto, may be used.

As stated heretofore, my invention with some changes can be applied to an alternating current, source. In Fig. 4 is shown the tube 1, 2, 3 and plate meter 4 in circuit with the cable 15 to be measured and the calibrated resistance 14 as described heretofore. A double-pole single throw switch 40 closes the circuit and allows current from an alternating current, source 41 to flow therethrough. A transformer primary 44 has an adjustable resistance 45 connected thereto which compensates for variations in tube characteristics and line voltage. The function is similar to that of the adjustable potentiometer in Figs. 1 and 2.

A grid and plate secondary 42 tapped by a switch 46 serves to feed current to the plate and grid. By means of the switch 46 different grid voltages for different ranges of the instrument are procured. A filament secondary 43 connects to the filament, and heats the filament. An inductance 47, of ten henries or more, is inserted in the grid circuit to balance the capacity in the unknown cable.

In this alternating current, modification the rectifying properties of the grid or control element are used as well as its amplifying effect, and due to the former effect, pulsating direct current, is applied to the unknown resistance. Since plate current $I_p$, flows only during the half cycles when the plate is positive, it is only during these half cycles that the grid has any effect on $I_p$, and since the grid is also made positive through $R_x$ at these times, it can vary $I_p$ depending upon the value of $R_x$.

Since $R_x$ may have capacity, $C_x$ as well, the inductance coil 47 is used to correct the decreasing effect of $C_x$ upon $I_p$, thus rendering the readings independent of $C_x$. This seems to be due to the fact that the inductance maintains the grid current, and therefore the grid potential, even after the potential, $E_t$, has decreased to zero again. This is probably due to the fact that the inductance spreads the grid current pulses over a greater portion of the half cycle and thus prevents the charge in $C_x$ making the grid negative and thereby distorting the plate current by making it more peaked whereby the average or direct current value of it as measured on the plate milliammeter 4 would be lower.

In the operation of this alternating current embodiment, to calibrate the tube all voltages may be varied by adjusting the rheostat 45 in the primary circuit 44.

This adjustment is available in addition to the infinity, or "free" grid adjustment which is adjusted by means of the zero-error adjustment on the plate meter.

To obtain several ranges as explained before different values of $E_t$ may be used. To do this, the high tension secondary winding 42 is tapped at suitable points and connected through a rotary switch 46 to the line terminal.

No grid shunting resistances, as 23, 22 in Fig. 2 can be used to give different ranges, because if capacity is present in the unknown material it will discharge through this resistance whenever its potential is greater than that of 42. Then, again, if the potential of 42 overcomes that of the capacity in the unknown a charging current will flow again into the unknown, from the grid. This would result in raising the potential of the grid more than if $R_x$ were the only means by which current could flow, so that the meter 4 would read values of the unknown that were too low.

For testing condensers, in general, a direct current model might be preferable, but if only limiting lower values are desired to be established for the condenser, the device, if necessary, can be calibrated on known good condensers, and used to test others thereafter. However, it is believed that the grid inductance 47 can correct the effect of capacity in the unknown if such effect be within reasonable limits.

Of course, this modification can be used in conjunction with any means for maintaining constant voltage across the primary and associated resistor.

Figure 5:
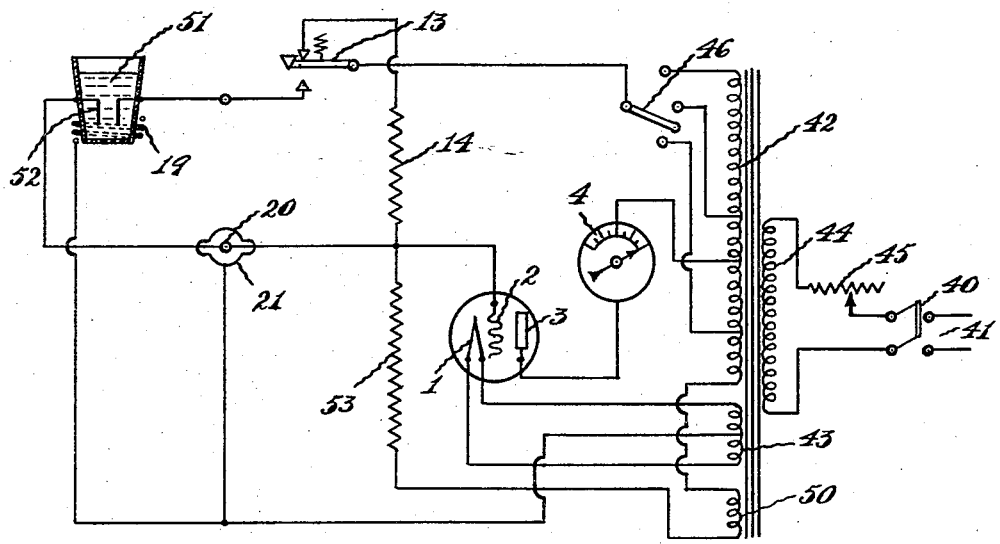
Fig. 5 shows an adaptation of the apparatus shown in Fig. 4 to the testing of an electrolyte.

I will now describe another application of the circuit shown in Fig. 4. It is necessary at times to measure $R_x$ (the unknown resistance) while passing alternating current through it. This occurs when $R_x$ is an electrolyte or earth (ground resistance test), in which case direct current cannot be used, since polarization is set up if it is. To measure such resistances, the method shown in Fig. 5, is employed. Elements found in Fig. 4 have the same numerals. Here the internal grid to filament resistance, $R_{gf}$, is shunted by an external resistor, 53, comparable to it in value. I have used one of about 50,000 ohms value, biased as shown by a reversed secondary winding 50 (of approximately three volts potential, or that of the "free" grid). During the positive half cycle this winding 50 is negative, and thus maintains the 50,000 ohm resistor 53 and connected grid at the same potential as when the latter is free.

Since $$I_p=0$$

during the negative half cycle, the grid can have a positive or any other bias without being able to affect the plate meter reading. An ordinary "C" battery may be used as an alternative. $R_x$ is here an electrolyte 51, whose capacity $C_x$ is so small compared to its conductance, $1/R_x$, that the former effect is negligible when the electrolyte is placed between two electrodes 52.

Two currents thus flow through $R_x$ viz., an alternating current, which also flows through 53, and a direct current, which flows through the rectifying grid. If $R_x$ is large, say one megohm or more and 53 is comparatively small, about equal to $R_{gf}$, the direct current component will be only a fraction of the alternating current component, so that substantially alternating current flows through $R_x$. At the same time, no inductance is required in the grid circuit as was in Fig. 4, for $C_x$ must be negligible, otherwise it will discharge through 53, and then on the next positive, charging half cycle, draw additional charging current through the grid, and thus indicate far too low a value for $R_x$. $C_x$ can be made small by proper design of the electrolytic cell. It is inherently small in the case of ground resistance tests.

Another effect of the resistor 53 is to decrease the sensitiveness of the device, or, in other words, make it read at full scale a much lower value of $R_x$. Since ground and electrolytic cell resistances are fairly low, this is a desirable feature.

Practically, this modification is effective since if the internal resistance of the tube between grid and filament, $R_{gf}$, is shunted with another resistance $R_{sh}$ (that is the resistor 53 in Fig. 5) it becomes necessary to bias it negatively with respect to the grid to oppose $e_s$—the filament potential projecting electrons to the grid—and prevent the grid from discharging through $R_{sh}$ and thus changing its own potential.

The resistance from the filament to the grid is now no longer $R_{gf}$, but less, and equal to $$\frac{1}{\frac{1}{R_{gf}}+\frac{1}{R_{sh}}}=R'_{gf},$$

where evidently $$R'_{gf} < R_{gf}.$$

Referring to Equations 1 and 2, described heretofore, we see that $I'_p$ and $$\frac{\delta I'_p}{\delta R_x}$$

will now be less, so that the range will be lower. In the case of the electrolytic cell, suppose $$R_{gf}=R_{sh}=50{,}000 \text{ ohms},$$

and $$R_x=1{,}000{,}000 \text{ ohms}.$$

During the positive half cycle, when the grid is conducting current, the total resistance of the grid circuit is $$R_x+\frac{1}{\frac{1}{R_{gf}}+\frac{1}{R_{sh}}}=1{,}000{,}000+\frac{1}{\frac{1}{50{,}000}+\frac{1}{50{,}000}}$$

$$=1{,}025{,}000 \text{ ohms}.$$

During the negative half cycle the potential is reversed; the grid carries no current; only $R_{sh}$ is carrying current. The resistance is now $$R_x+R_{sh}=1{,}050{,}000 \text{ ohms}.$$

Thus, the total grid resistance varies 25,000 ohms out of 1,025,000 ohms, or 2.4% at the most. Hence, substantially alternating current passes through $R_x$, and the higher its value the more nearly is this so.

This form of instrument is calibrated and compensated for variations in line voltage in a manner similar to the method shown in the alternating current modification shown in Fig. 4.

If desired, various values of resistances may be used for 53 to provide different ranges, instead of using different grid voltages through switch 46. The lower the resistance of 53, the more nearly alternating current is the current through $R_x$.

It is also possible to use another audion tube in place of the resistance 53.

In that case either tube would act both as shunt resistance to the other and also as an indicator, or rather, measuring device. Each feeds current through the plate meter on alternate half cycles. Due to the oppositely rectifying properties of the grids of these two tubes true alternating current flows through $R_x$.

Figure 6:
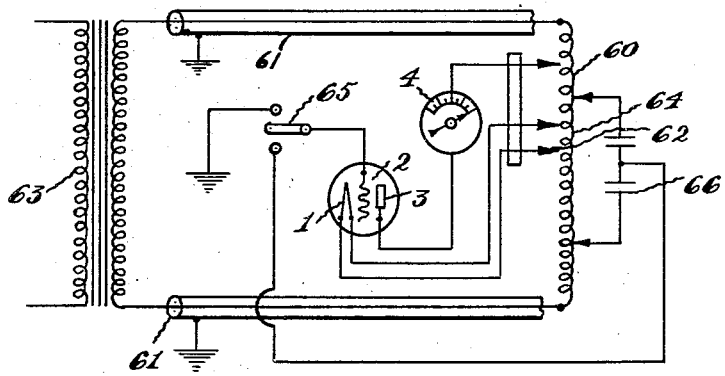
Fig. 6 shows another adaptation of the apparatus shown in Fig. 4 as a ground detector for an ungrounded polyphase system.

Another application of my invention is as a ground detector on an ungrounded alternating current system. As shown in Fig. 6, the circuit is set up for one phase of a two phase ungrounded system.

An auto transformer 60 is connected across the two live cables 61 which lead from the ungrounded secondary of the station-bank transformer 63. For a direct current system a resistor may be used instead of an auto-transformer. The auto-transformer 60 is tapped by a series of three taps 64 designed to move as a unit on a support 62. The lead sheaths of the cables 61 are grounded, as is also the grid of the audion tube. It should be noted that normally the lower two taps 64 are slightly above the center point of the transformer 60, so that, if the capacity and insulation resistance of both cables are equal (or insulation resistances negligible), ground is half way in potential between the two live conductors, and the filament is therefore slightly positive to ground and therefore to grid.

A two-point switch 65 connects the grid 2 to the ground, or to the center-tap of two condensers 66 connected in series, which act as impedances. The condensers are so arranged that they tap off 60 at any points desired.

The voltage to ground from either live cable depends upon the relative values of $C_x$ and $R_x$ for the insulation of each cable.

If these are the same for the two, and are uniformly distributed on all pieces of connected apparatus, the voltage from each live cable to ground is one half of the voltage between the two cables.

The grid is at ground potential, and, in the above case, would be half-way in potential from either conductor. Suppose the plate current $I_p$ may vary from zero to some safe allowable upper value, $I_{pm}$, and that the filament is adjusted on the auto-transformer to be at such a potential with respect to the grid that $$I_p = \tfrac{1}{2} I_{pm}.$$

Then, if the grid becomes more negative with respect to the filament than the above adjustment, $I_p$ decreases below its value of $\tfrac{1}{2} I_{pm}$. If, on the other hand, the grid becomes less negative, or even positive, with respect to the filament, $I_p$ increases above its normal value of $\tfrac{1}{2} I_{pm}$.

Normally, $C_x$ for the two cables remains constant if no changes are made in the circuit, and only $R_x$ may vary as the cable ages. If the top cable grounds, $R_x$ for its insulation decreases to a value, let us say, of 10 megohms or less, while $R_x$ for the bottom cable remains unchanged. The ground shifts toward the top cable in potential, as does the grid connected to it, while the filament, connected to 61, is kept at the same potential with respect to either cable as before. The grid thus becomes less negative with respect to the filament than it was before, or even positive to it, depending upon how effectively the top cable is grounded, and so $I_p$ increases.

If, on the other hand, the bottom cable grounds, the grid becomes more negative with respect to the filament, and $I_p$ decreases. If both cables ground equally, $I_p$ remains unchanged, but this is a fault common to practically all ground detectors, and is, moreover, unlikely to occur.

$I_p$ would change if another tube were used, or if the characteristics of this tube were to change. To check this, the impedances 66 are used. These may be resistances, inductances, or condensers. They are here shown as condensers, in order more closely to simulate the insulation impedance of the cables. These are designed to maintain their characteristics (impedance values)

during the life of the detector, and when the latter is adjusted to the cable, the voltage across these two impedances is adjusted until, when the grid is switched over to their mid-point, the same plate current obtains. Hereafter, if $I_p$ changes in normal operation, and does not when the grid is connected to their center tap, we know that the two conductors have changed in potential to ground, the change in $I_p$ indicating which cable is at fault.

It will thus be seen that I have devised an ohmmeter utilizing the operating principles of an audion tube and having the following advantages, among others:—

1. Cheap to build—the most expensive part is the milliammeter used as a platemeter.
2. Simple in operation—no leveling nor cranking necessary as in a galvanometer ohmmeter. The push button switch enables instant correction for voltage or tube characteristic variations.
3. Can be operated on alternating current, or direct current. With alternating current, any desired high voltage may be easily obtained through a transformer.
4. Mechanically rugged. The sensitive parts are the static elements of an audion tube, which, if mounted upon a spring socket, are relatively immune to mechanical shocks. The moving element is a comparatively rugged milliammeter instead of a delicate galvanometer which requires leveling.
5. Any sensitiveness desired may be obtained by choosing a tube of high enough amplification power, and also by the choice of a high enough grid voltage.
6. Can read up to 50 megohms or more with as low a voltage as 5 volts applied to $R_x$. This is important in testing grid leaks and other resistances of very low current-carrying capacity.
7. For testing electrolytes, alternating current may be applied to them, without the need of rotating commutating switches to accomplish this (as is necessary in the Dionic water tester.)
8. Since the indicating instrument (plate milliammeter is, in the high resistance plate circuit, it can be of fairly high resistance itself. This means that a not very sensitive meter is required i. e., one requiring a low voltage as well as low current (for example one milliampere full scale) input to actuate it. Therefore, as long as the meter is accurate (reproducible in its readings), it need not be delicate nor expensive. The sensitive part of the entire device is the grid circuit of the vacuum tube.

It will be obvious that the general principles herein disclosed may be employed in many other organizations widely different from those illustrated, without departing from the spirit of the invention as defined in the following claims.

Having thus described my invention, what I claim and desire to secure by Letters Patent of the United States is:—

1. An apparatus adapted to ascertain the electrical conductivity of a material comprising an audion tube having a free grid, a source of grid potential, a source of filament heating current, a source of plate current and means associated with said grid potential source and the grid of said tube to receive said material in circuit with said grid and potential source, a plate meter, and means associated with said grid and potential source to give a constant reading on said plate meter of the conductivity of said material at a predetermined voltage of said grid potential source.

2. An apparatus of the class described comprising an audion tube having a free grid, a source of filament heating current, grid potential and plate current, a plate meter, means associated with said grid potential source to adjust the potential output thereof whereby readings on the plate meter correspond to values of the conductivity of a material in circuit with the grid of said tube and said grid potential source.

3. An apparatus of the class described comprising audion means, a sole source of current adapted to heat the filament of said audion means, supply plate current and potential to the grid thereof, plate current reading means associated with said audion means, and an unknown material whose conductivity is to be ascertained in series between the grid of said audion and a point on said current source whose potential is positive with respect to the filament potential.

4. An apparatus of the class described comprising audion means having a normally open grid circuit, a sole source of current adapted to heat the filament of said audion, supply plate current and supply potential to the grid thereof, plate current reading means associated with said audion, and an unknown material whose conductivity is to be determined in said open grid circuit between a positive potential point of said current source and said grid.

5. An apparatus of the class described adapted to be used in connection with an electric current source comprising a filament circuit, a plate circuit, a grid circuit, all supplied from said current source, a plate meter in said plate circuit, means connected between the grid circuit and a point on the source which is positive with respect to the filament potential to adjust the potential of the current flowing into said grid circuit, and means in said grid circuit to receive materials for measurement of the conductivity thereof, a reading on said plate meter at an adjusted grid potential corresponding to said conductivity said grid being essentially free.

6. A direct reading ohmmeter, adapted to measure the conductivity of a material comprising a current source, an audion tube in circuit therewith, an adjustable potentiometer associated with said audion tube in the grid circuit thereof adapted to deliver an adjusted positive potential to the grid of said tube, the filament and plate of said tube being supplied with current from said source, a plate meter in the plate circuit of said tube, a calibrated resistance associated with said grid circuit, a switch, normally connected to said calibrated resistance and said adjustable potentiometer depressible to connect said material to said grid circuit whereby plate current readings are obtained on said plate meter which are a measure of the conductivity of said material, said adjustable potentiometer including one or more adjustable taps to furnish various adjustable voltages to said grid whereby said ohmmeter is rendered multi-range, zero-error correction means associated with said plate meter and cooperating with said calibrated resistance at a predetermined grid voltage range to render the plate meter readings independent of tube or voltage variations.

7. In combination, an electron discharge tube having anode, cathode and control electrode circuits, a power line source of current connected to all said circuits for energizing them, a material of unknown conductivity between the control electrode and said source, adjustable means for applying a predetermined positive bias on the control electrode from the source, a conductivity indicating means in the anode circuit, and a calibrating impedance in the control electrode circuit.

8. In combination, an electron discharge tube provided with a control electrode circuit normally open for the flow of current from the cathode, a sole source of potential for applying a predetermined positive voltage to said control electrode, means in the control electrode circuit, adapted to be electrically associated with a material whose conductivity is to be determined, connected to said potential source, and means in the anode circuit of the tube for indicating the conductivity of said material at said predetermined voltage.

9. In combination, an electron discharge tube provided with a control electrode circuit normally open for the flow of direct current from the cathode, a sole source of potential for applying a predetermined voltage to said control electrode which is positive with respect to the tube cathode potential, means connected to the control electrode circuit, adapted to be electrically associated with a material whose conductivity is to be determined, connected to said potential source, and means in the anode circuit of the tube for indicating the conductivity of said material at said predetermined voltage.

10. In combination, an electron discharge tube provided with a control electrode circuit normally open for the flow of current from the cathode, a source of positive potential for applying a predetermined positive voltage to said control electrode, means in series with the control electrode circuit, adapted to be electrically associated with a material whose conductivity is to be determined, connected to said potential source, and means in the anode circuit of the tube for indicating the conductivity of said material at said predetermined voltage.

11. In combination, an electron discharge tube provided with a control electrode normally isolated for the flow of current from the cathode, a source of alternating current potential for applying a predetermined voltage to said control electrode, means in the control electrode circuit, adapted to be electrically associated with a material whose conductivity is to be determined, connected to said potential source, and means in the anode circuit of the tube for indicating the conductivity of said material at said predetermined voltage.

12. In combination, an electron discharge tube provided with a control electrode normally isolated for the flow of current from the cathode, a source of alternating current potential for applying a predetermined voltage to said control electrode, means in series with the control electrode circuit, adapted to be electrically associated with a material whose conductivity is to be determined, connected to said potential source, and means in the anode circuit of the tube for indicating the conductivity of said material at said predtermined voltage.

13. In combination, an electron discharge tube provided with a control electrode circuit normally open for the flow of current from the cathode, a sole source of positive potential for applying a desired operating positive voltage to said control electrode, means in the control electrode circuit, adapted to be electrically associated with a material whose conductivity is to be determined, connected to said potential source, and means in the anode circuit of the tube for indicating the conductivity of said material at said desired operating voltage.

14. In combination, an electron discharge tube provided with a control electrode circuit normally open for the flow of current from the cathode, a source of potential for applying a desired operating voltage to said control electrode, means in the control electrode circuit, adapted to be electrically associated with a material whose conductivity is to be determined, connected to said potential source, means in the anode circuit of the tube for indicating the conductivity of said material at said desired operating voltage, and additional means for establishing substantial constancy of said operating voltage during conductivity determination.

15. In combination, with an electron discharge tube provided with grid, cathode and anode circuits, an indicating means in said anode circuit, said grid circuit including a source of positive grid biasing potential and means for receiving in electrical association a material whose conductivity is unknown and is to be determined, the grid having a desired initial potential when said material is unassociated with said receiving means, said grid potential source being adapted to bias said grid to a potential different from the said initial potential and in a sense to make it more positive when said material is electrically associated with said receiving means, said indicating means being adapted to translate the change in grid potential from said initial value to said different value into a conductivity indication.

16. An apparatus of the class described comprising an electron discharge tube having a free control grid, a source of cathode heating current, grid potential and anode current, conductivity indicating means, disposed in a path including said anode, and an additional device constructed, and operative in conjunction with said indicating means, in such a manner that a predetermined indication of said means indicates the same magnitude of conductivity of a material in circuit with said grid regardless of tube characteristic and source voltage variations.

17. An electrical measuring instrument comprising an electron discharge tube having a grid circuit which is normally open, a source of positive potential in said grid circuit, means in the grid circuit arranged for electrical association with a material whose conductivity is to be measured, a conductivity indicating means in the anode circuit of the tube, said source being adapted to apply a positive bias to said grid which depends upon the conductivity of said material, said indicating means being rendered readable when said material is associated with said grid circuit to close the same.

18. In combination, an electron discharge tube having cathode, anode and grid circuits, direct current supply means for energizing the said circuits, said supply means being arranged to apply a positive potential to the grid when a material whose conductivity is to be determined is disposed in said grid circuit between the grid and said supply means, means connected to said supply means to secure multi-range readings and means in the anode circuit of the tube to indicate the conductivity of said material.

19. In combination, a tube having cathode, anode and grid circuits, direct current supply means for energizing the various circuits of the tube and for applying a positive potential to the grid, means to receive a material whose conductivity is to be determined in the grid circuit, means in the anode circuit for measuring the current flowing therein, resistors of predetermined magnitude arranged to be connected between the grid and the cathode of the tube for rendering said measuring means multi-range, the grid being normally free when said resistors are disconnected from the grid of said tube.

20. In combination, a tube having cathode, anode and grid circuits, direct current supply mains for energizing the various circuits of the tube, resistances in potentiometric arrangement for applying a predetermined positive potential to the anode with respect to the cathode, and for applying a positive potential to the grid, normally free, with respect to the cathode, means for adjusting the grid potential, means in said grid circuit for receiving a material whose conductivity is to be determined, and means in the anode circuit for indicating the conductivity of said material when connected in the grid circuit.

21. In an electrical measuring instrument, a tube having cathode, anode and grid circuits, an alternating current supply means for energizing the various circuits of the tube, said supply means being adapted to apply an alternating current potential to the control electrode grid of said tube when the latter is free, means for adjusting the potential applied to said grid to render the instrument multi-range, means in the grid circuit of the tube to receive a material whose conductivity is to be determined and a conductivity indicating means in the anode circuit of the tube.

22. In combination, with an electron discharge tube provided with grid, cathode and anode circuits, an indicating means in said anode circuit, said grid circuit including a sole source of positive grid biasing potential and means for receiving in electrical association a material whose conductivity is unknown and is to be determined, the grid having a desired initial potential when said material is unassociated with said receiving means, said grid potential source being adapted to bias said grid to a potential different from the said initial potential and positive with respect to said cathode potential when said material is electrically associated with said receiving means, said indicating means being adapted to translate the change in grid potential from said initial value to said different value into a conductivity indication.

ALBERT PREISMAN.